United States Patent
Fujiwara

(10) Patent No.: US 7,303,289 B2
(45) Date of Patent: Dec. 4, 2007

(54) PROJECTION TYPE DISPLAY APPARATUS

(75) Inventor: Akihiro Fujiwara, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 11/067,078

(22) Filed: Feb. 25, 2005

(65) Prior Publication Data

US 2005/0195375 A1    Sep. 8, 2005

(30) Foreign Application Priority Data

Mar. 2, 2004 (JP) ............................. 2004-057109

(51) Int. Cl.
*G03B 21/00* (2006.01)
*G03B 3/00* (2006.01)

(52) U.S. Cl. ........................................ 353/101; 353/46

(58) Field of Classification Search ................ 353/69, 353/101, 46; 352/140; 343/46, 69, 101
See application file for complete search history.

(56) References Cited

U.S. PATENT DOCUMENTS 6,670,603 B2 * 12/2003 Shimada et al. ............ 250/235

FOREIGN PATENT DOCUMENTS

JP              9-197249          7/1997

* cited by examiner

*Primary Examiner*—Rodney Fuller
(74) *Attorney, Agent, or Firm*—Morgan & Finnegan, LLP

(57) ABSTRACT

A projection type display apparatus includes a projection portion for projecting an image onto a surface to be projected, a light receiving portion disposed apart from the projection portion by a base line length and used for detecting a reference image projected onto the surface to be projected, and a scanning portion for scanning the reference image on the surface to be projected in a direction of the base line length, in which the projection portion is focused based on information about a scanning position of the reference image upon predetermined detection with the light receiving portion. With the projection type display apparatus, a system can be configured with a simple processing circuit, and cost reduction can be realized.

6 Claims, 8 Drawing Sheets

PROJECTION TYPE DISPLAY APPARATUS

BACKGROUND OF THE INVENTION

1. Field of the Invention

The present invention relates to a projection type display apparatus (transmission type liquid crystal projector, reflection type liquid crystal projector, or the like). In particular, the invention relates to an automatic focusing device of a front projector.

2. Related Background Art

Some proposals have been made hitherto on a focusing method used for a projection optical system in a projection type display apparatus (hereinafter referred to as projector).

Japanese Patent Application Laid-Open No. H09-197249 discloses this kind of projector having a structure in which a focusing operation is performed such that a reference image is projected onto substantially the center of a projection area on a screen surface by projection optical means, and light reflected by the surface is allowed to pass through a slit and received by a line sensor, and then a position of the light incident on the line sensor is detected.

The projector disclosed in Japanese Patent Application Laid-Open No. H09-197249 requires, however, complicated signal processing where a line sensor is used to receive light of a reference image, and its position on the line sensor is determined by calculation through signal processing. Besides, such a projector costs high because the line sensor itself is expensive. Further, even in the case of using an inexpensive sensor such as a silicon photodiode in place of the expensive line sensor, the structure of the projector disclosed in Japanese Patent Application Laid-Open No. H09-197249 necessitates any mechanical mechanism and involves high costs either way.

In addition, as regards operating environments of a projector, the projector is used under ordinary room lighting in many cases. In such cases, the structure of the projector disclosed in Japanese Patent Application Laid-Open No. H09-197249 has the following problem to attain a sufficient focusing accuracy. That is, since the projector disclosed in Japanese Patent Application Laid-Open No. H09-197249 uses a high-sensitivity sensor such as a line sensor, when a screen is lighted up with normal interior illumination, the sensor detects a good amount of ambient light components in addition to light projected by projection means. As a result, a barycentric position of a reference image to be detected varies depending on the amount thereof. This means that the projector should be used with the interior illumination tuned off in order to realize ideal focusing.

SUMMARY OF THE INVENTION

In light of the above-mentioned problems, the present invention has an object to provide a projection type display apparatus where a system can be configured with a simple processing circuit, and cost reduction can be realized.

The present invention provides a projection type display apparatus having the following structure. That is, according to one aspect of the invention, a projection type display apparatus includes a projection portion for projecting an image onto a surface to be projected, a light receiving portion disposed apart from the projection portion by a base line length and used for detecting a reference image projected onto the surface to be projected, and a scanning portion for scanning the reference image on the surface to be projected in a direction of the base line length, in which focusing in the projection portion is performed based on information about a scanning position of the reference image upon predetermined detection with the light receiving portion.

According to another aspect of the invention, a projection type display apparatus includes a projection portion for projecting an image formed on an image forming element onto a surface to be projected, a light receiving portion disposed apart from the projection portion by a base line length and used for detecting a reference image projected onto the surface to be projected, and a transmitting portion for transmitting an image signal to the image forming element such that the reference image is scanned on the surface to be projected in a direction of the base line length, in which focusing in the projection portion is performed based on information about a scanning position of the reference image upon predetermined detection with the light receiving portion.

According to a further aspect of the invention, in the projection type display apparatus, the light receiving portion includes a single-cell photosensor, and focusing in the projection portion is performed based on information about a scanning position of the reference image for situations where a signal detected by the light receiving portion has the maximum intensity.

According to a further aspect of the invention, in the projection type display apparatus, the light receiving portion includes a two-cell photosensor, and focusing in the projection portion is performed based on information about a scanning position of the reference image for situations where signals detected by each of the two-cell photosensor in the light receiving portion have substantially the same intensity.

According to a further aspect of the invention, in the projection type display apparatus, each time the reference image is scanned by a predetermined amount, the projection portion is driven for focusing and the light receiving portion performs detection.

According to a further aspect of the invention, in the projection type display apparatus, the information about the scanning position of the reference image includes a distance between the reference image on the surface to be projected and an optical axis of the projection portion.

According to a further aspect of the invention, the projection type display apparatus further includes an amplifying portion for amplifying a signal detected by the light receiving portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, preferred embodiments of the present invention will be described. Prior to detailed explanation thereof, a basic concept of the present invention is described first.

Figure 1A:
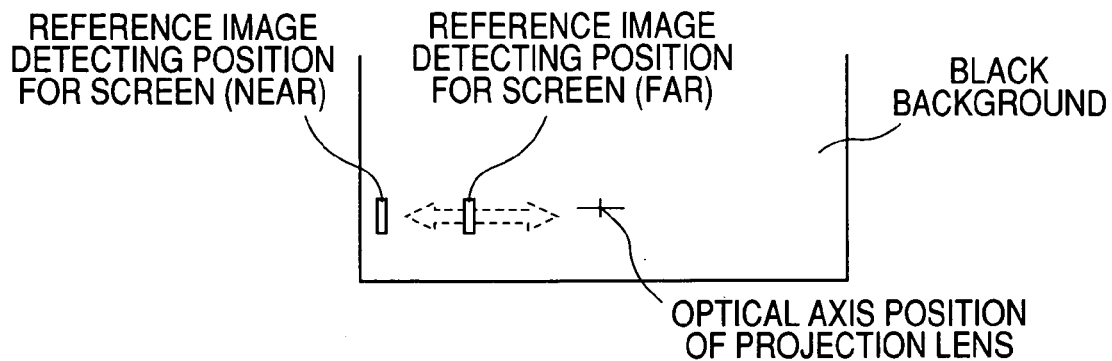
FIGS. 1A and 1B show a screen as viewed from a projector side and a positional relation between the projector and screen as viewed from above for explaining a basic principle of the present invention, respectively.
Figure 1B:
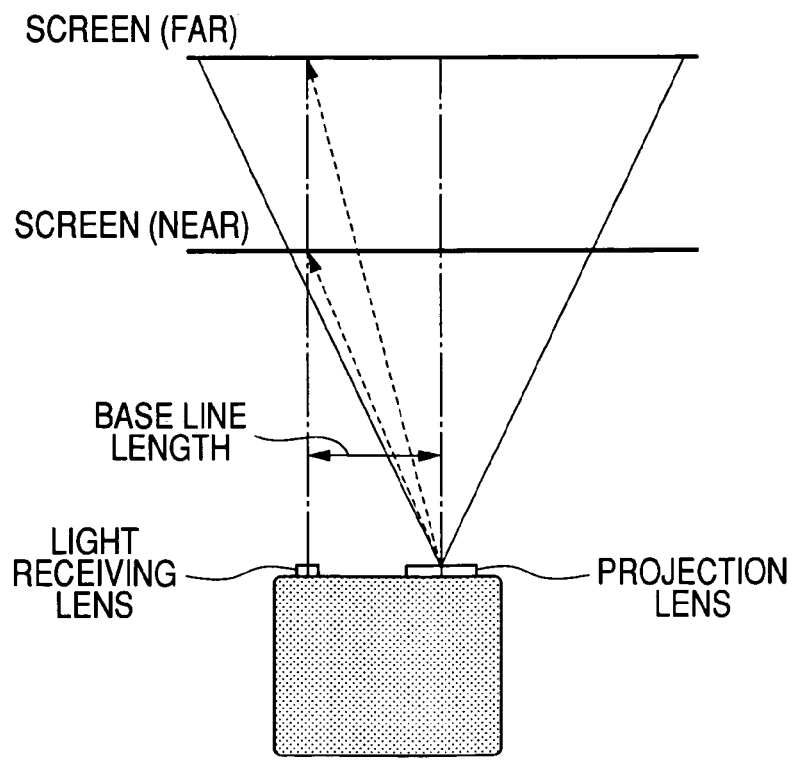

FIGS. 1A and 1B illustrate the principle indicative of a basic concept of the present invention. The present invention is based on a so-called active triangulation principle employed for an image-taking device etc. FIGS. 1A and 1B are given to illustrate the principle. In the image taking device etc., an infrared LED or the like is generally used to apply reference spot image to a subject, and the reflected light is received by a photodiode, a CCD sensor, or the like, and the distance to the subject is calculated from a displacement of a detecting position, due to the parallax.

Here, active distance-measuring methods are classified into two types. One is a method in which scanning is performed in a light projection side and detecting a peak position by a fixed light receiving sensor. The other is a method in which the projection device is fixed and the position of the light-projected image is detected by mechanically moving a single-cell light receiving sensor or by a line sensor, or the like. The system of the present invention is devised while focusing attention on the former method; as a specific method of scanning an object with a light-projected spot, scanning is performed by, for example, making an image projecting function of a projector double as a scanning function. That is, light-projected spot is formed as a projected image, and the thus formed image is moved in a time-series manner to thereby obviate the need for mechanical scanning with the reference spot of the infrared LED.

FIG. 1B shows a positional relation between the projector and screen as viewed from above. In FIG. 1B, a light receiving lens is disposed apart from a projection lens by a base line length (on the left in FIG. 1B). Besides, in this arrangement, optical axes of the two lenses are parallel to each other. FIG. 1A shows the screen as viewed from the projector side, and illustrates how a vertically elongated line image as a reference image is formed on a black background, and the screen is scanned laterally in a time-series manner.

Those figures are referenced to explain a difference between a far screen and a near screen as below. With the screen placed farther from the projector, if the reference image is projected in the vicinity of the center of the screen, i.e., at a position closer to an optical axis of the projection lens, the reflected light enters straightly the light receiving lens. In contrast, with the screen placed nearer to the projector, if the reference image is projected on the left of the screen, i.e., at a position distant from the optical axis of the projection lens, the reflected light enters straightly the light receiving lens. Based on the triangulation principle, the relation among coordinates of the reference image, the distance to the screen, and the base line length is represented by a simple relational expression. The distance to the screen can be derived from the relational expression. A specific calculation method will be described later with reference to FIG. 3.

Figure 2:
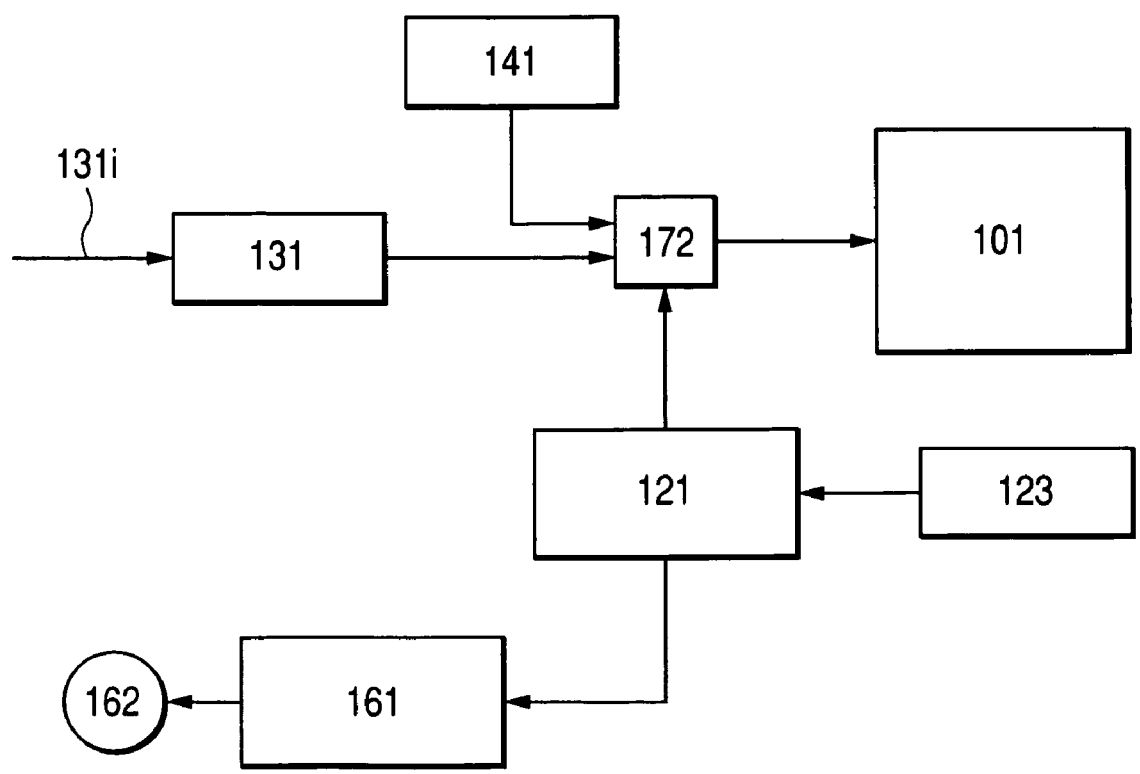
FIG. 2 is a block diagram showing a structure of an electric circuit for explaining a projector according to an embodiment of the present invention with analog processing means.

Next, description will be given of a projector according to the embodiment of the present invention, to which the above-mentioned active triangulation principle is applied. A general circuit configuration of a widely used projector as shown in FIG. 2, for example, is applicable to the projector according to the embodiment of the present invention. In FIG. 2, reference numeral 101 denotes display means, which is a generally provided for the projector and whose detailed description is thus omitted here. Examples of the generally equipped component of the projector include a liquid crystal panel as image forming means, a driver circuit therefor, a light source such as an ultra-high-pressure mercury lamp, and a projection optical system. When an image signal is inputted thereto, an image corresponding to the image signal can be projected onto the screen.

Reference numeral 121 denotes a controller constituted by a microprocessor etc. for controlling a processing sequence. Reference numeral 123 denotes a light receiving sensor constituted by a single-cell silicon photodiode. Although not shown in FIG. 2 because of simple illustration, voltage-amplifying means is provided for amplifying a signal voltage to a required level because of a weak output signal, and the output signal is inputted to an A/D converter in the controller 121 and read as a digital signal by the controller.

Reference numeral 131 denotes image input means for receiving an input signal 131i from the outside, which is converted to digital information receivable in the display means 101. Reference numeral 141 denotes reference image signal generating means having a function for creating a reference image necessary for measuring the distance under the control of the controller 121.

Figure 4A:
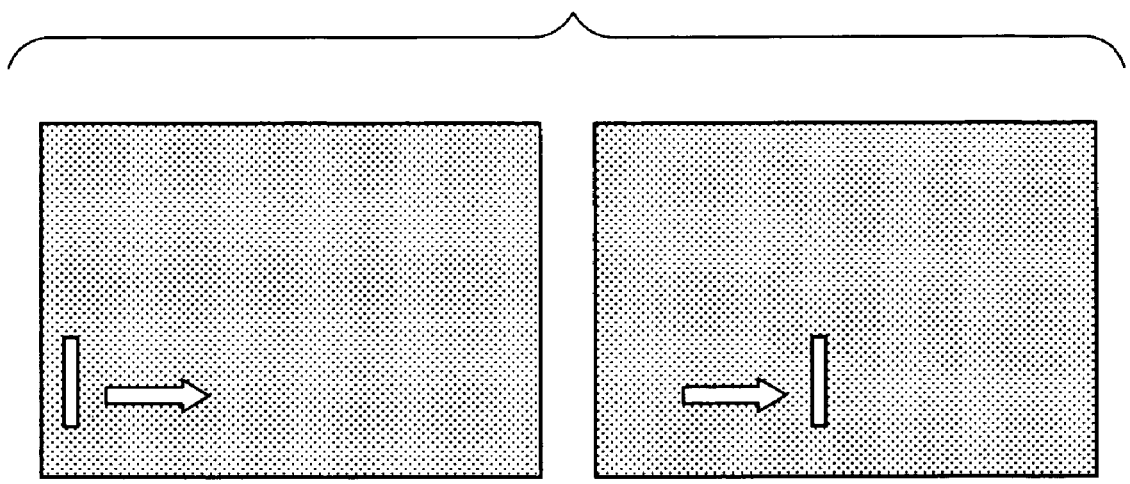
FIGS. 4A and 4B show a projection reference image and a structure of a light receiving sensor according to the embodiment of the present invention, respectively.

An example of the reference image formed here will be described later with reference to FIG. 4A. Reference numeral 172 denotes image signal switching means, that is, a video switch. The switch is used to switch between a normal image from the image input means 131 and a distance-measurement image from the reference image signal generating means 141 under the control of the controller 121, and transmit the image to the display means 101. Reference numeral 161 denotes focus motor driving means for driving the projection lens for focusing through forward or reverse rotation of a focus motor 162. Those operations are effected under the control of the controller 121.

Given above is the method using so-called analog processing means. Next, referring to FIGS. 5 to 6B, description will be given of how to realize a function comparable with that of the reference image signal generating means 141 with a general circuit configuration of a widely used projector by use of digital processing means.

Figure 5:
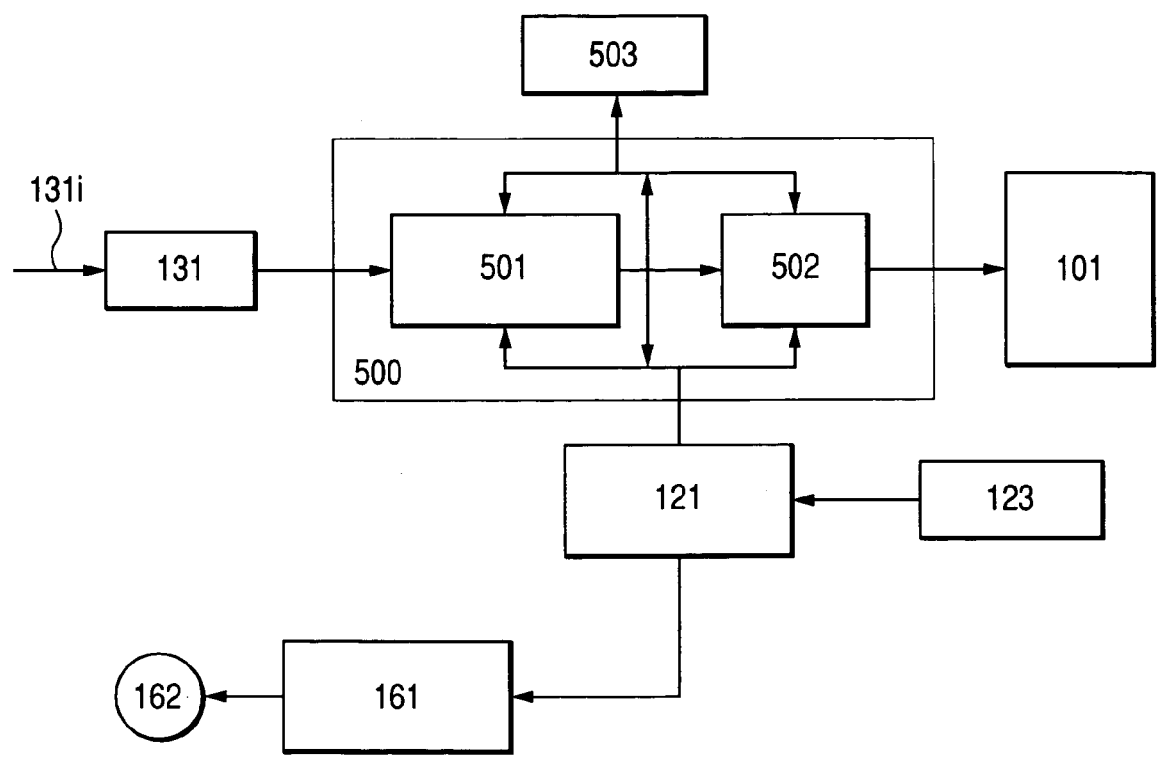
FIG. 5 is a block diagram showing a structure of an electric circuit for explaining the projector according to the embodiment of the present invention with digital processing means.

Reference numeral 500 denotes a large-scale integrated circuit called a scaler chip. In recent years, a number of integrated circuits equivalent to this circuit have been developed. This chip has various functions required for a display apparatus; a resolution conversion circuit 501 and an on screen display (OSD) 502 in FIG. 5 are important and indispensable functions of the present invention. Further, an external high-speed memory 503 is connected to the scaler chip and mainly functions as a frame memory.

In the present invention, the memory 503 and the controller 121 are configured outside the scaler chip 500, however some scaler chips incorporate those components and thus contribute to a compact system or the like. Other blocks are the same as that in FIG. 2 in terms of their functions, and detailed description thereof is omitted here.

Next, functions of each portion will be described in accordance with a signal flow. The digital image signal outputted by the image input means 131 is inputted to the resolution conversion circuit 501 in the scaler chip 500 and temporarily written into the high-speed memory 503 at a predetermined first timing. Thereafter, the written image data is read at a predetermined second timing and then sent to the OSD 502 at the subsequent stage. The resolution conversion function is realized in accordance with a relationship between the first timing (for writing) and the second timing (for reading). The second timing (for reading) corresponds to the resolution (1,024×768, 60 Hz, in this embodiment) of the display means 101.

Figure 6A:
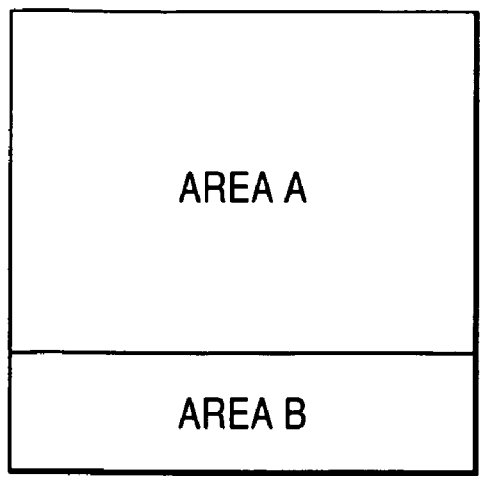
FIG. 6A illustrates a relation between use areas in a high-speed memory for explaining the embodiment of the present invention.

The high-speed memory 503 functions as a frame memory as described above, but all of the memory area is not used. As shown in FIG. 6A that illustrates the area of the high-speed memory, a part of the area is not used as an area B aside from the area A.

The OSD 502 generally outputs the digital image signal sent from the resolution conversion circuit 501 as it is, and has a function of displaying a given image at a given position of a display screen in a superimposed manner under the control of the controller 121. The given image to be displayed in a superimposed manner is created by the controller 121 and written into a part of area (the above area B in FIG. 6A) in the high-speed memory 503.

Here, the OSD 502 displays the given image read out from the area B in place of the input image signal read out from the area A in the high-speed memory 503 in response to an instruction of the controller 121.

Figure 6B:
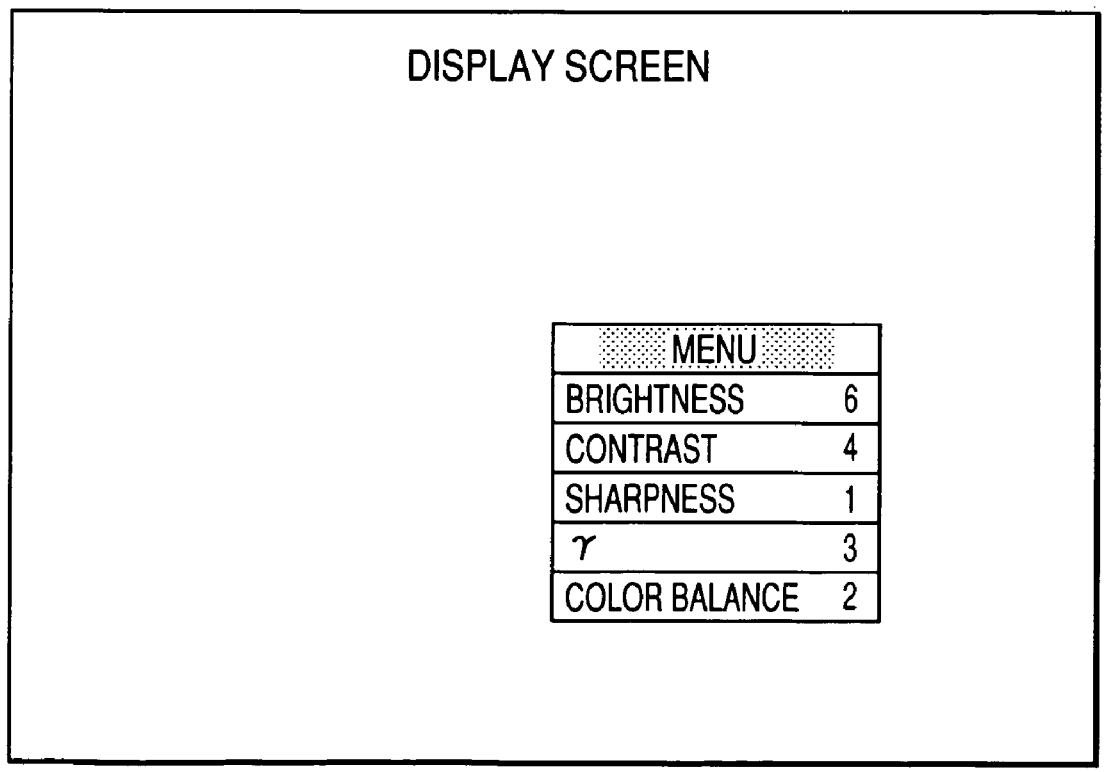
FIG. 6B shows a display example in a menu screen for explaining the embodiment of the present invention.

The given image described above generally serves as a so-called menu screen used for various settings and adjustments of the display apparatus. FIG. 6B shows a display example. In this embodiment, the image is used for realizing a function of creating a reference image for focusing. With this function, in order to obtain a peak position with a fixed light receiving sensor based on the active triangulation by scanning performed by a projecting device, it is possible to perform scanning in the base line length direction by the projecting device without providing the projecting device with any mechanical scanning means. That is, this makes it possible to display the reference image for focus adjusting at a given position by the same method as that for displaying the menu screen at a given position of the display screen.

In the case of displaying the reference image with the above method, all the digital signals are processed at the same time within the scaler chip. Hence, an accurate control can be attained such that a display position of the reference image completely coincides with a pixel structure (1,024×768 in this case) of the display screen, and no error occurs in this processing.

Figure 3:
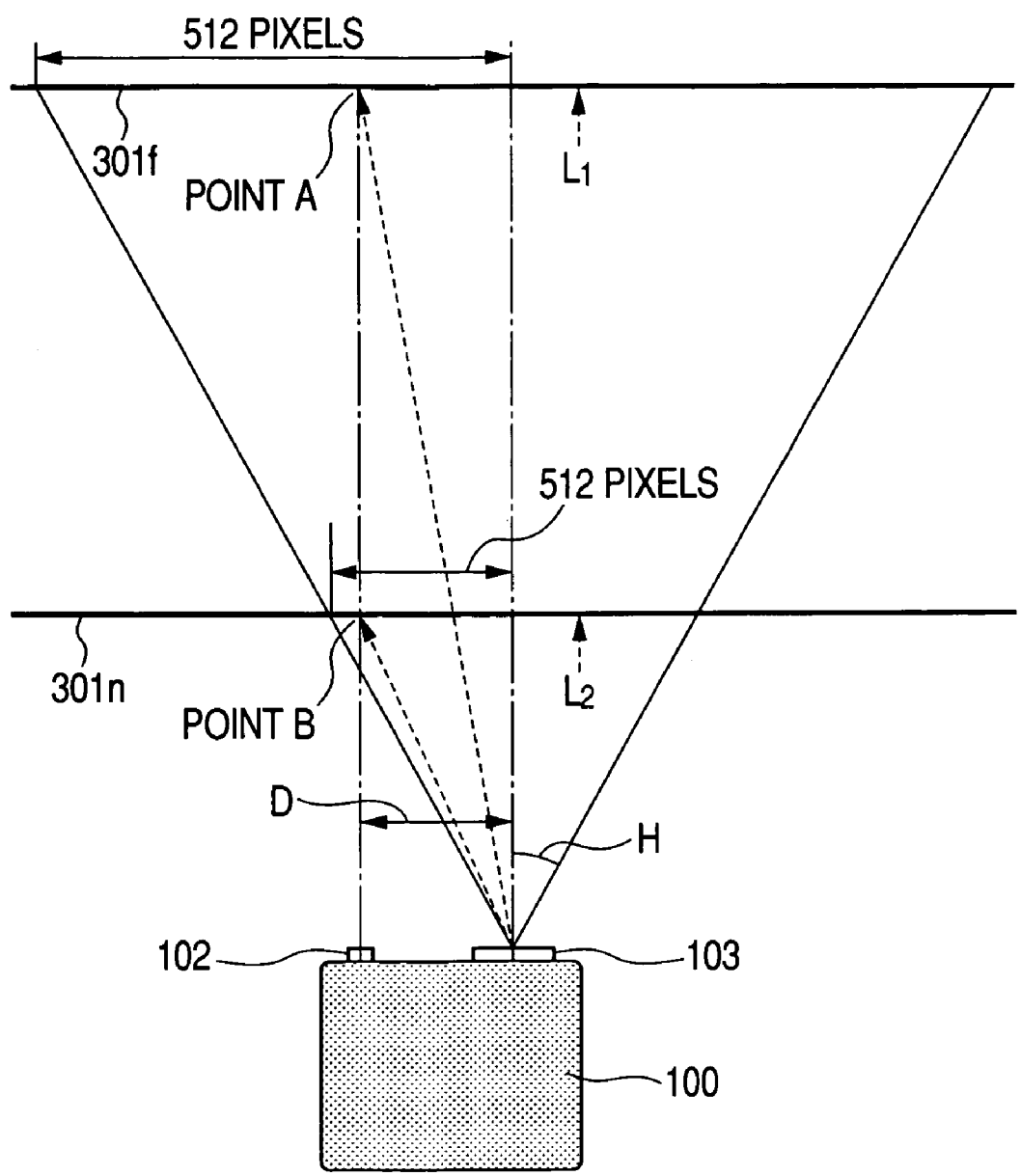
FIG. 3 illustrates a procedure for calculating a distance to a screen according to the embodiment of the present invention.

Next, FIG. 3 will be referenced to give detailed description about a procedure for calculating a distance to the screen. In FIG. 3, reference numeral 100 denotes a projector main body; 102, a light receiving optical system; and 103, a projection optical system. Preconditions for the following description are described first.

A pixel structure of the image confirms to a so-called XGA format, that is, 1,024 dots (horizontal)×768 dots (vertical). The optical axes of the projection optical system 103 and the light receiving optical system are parallel to each other. An interval therebetween, that is, the base line length D is 200 (mm). Upon setting a projection angle of the projection optical system, a 100-inch image is projected at an image ratio of 3:4 onto a screen placed at a distance of 4.0 (m). In other words, the width of the image on the screen at the distance of 4.0 (m) is 80 inches, i.e., 2,032 (mm).

The angle of view±H in the horizontal direction is calculated as follows: tan H=(2,032/2)/4,000=0.254. Incidentally, at this time, a pixel pitch equals to 2,032/1,024=1.98 (mm). Assuming that the distance to the screen is 1.0 (m), the horizontal width of the projected image is calculated as follows: 1,000×tan H×2=508 (mm). The pixel pitch equals to 508/1,024=0.496 (mm).

In FIG. 3, reference symbol 301$f$ denotes a screen placed far from the projector; and 301$n$, a screen placed near the projector. The light receiving sensor detects a peak signal when a vertical line of the reference image overlaps the optical axis of the light receiving lens (light receiving optical system) 102. This position remains apart from the optical axis of the projection lens 103 by D=200 (mm), and is a point A on the screen 301$f$ and a point B on the screen 301$n$.

Here, the following relational expression can be used to calculate how many pixels the point A or B diverges from the center (optical axis of the projection optical system) with respect to a distance L to each screen, that is, a position of a pixel corresponding to the point A or B. Letting x be the number of pixels counted from the center of the screen (optical axis of the projection optical system), the following equation, $$x/1,024=D(2L\cdot\tan H),$$

is satisfied. The distance L to the screen can be calculated from this relational expression as follows:

$$L=512D/(x\cdot\tan H)=403150/x.$$

To give two examples, the number of pixels and the distance are calculated as follows:
Example 1: x=50 (dots)
  L1=8063 (mm) (≈8 (m))
Example 2: x=300 (dots)
  L2=1344 (mm) (≈1.3 (m)).

Next, referring to FIGS. 4A and 4B, explanation will be given of how the reference image is displayed and the light receiving sensor detected this image. Two views of FIG. 4A show the vertically elongated lines corresponding to the reference images, which are displayed on the black background. The image on the extreme left (left-hand view) is moved line by line in a time-series manner to substantially the center of the screen (right-hand view).

Figure 4B:
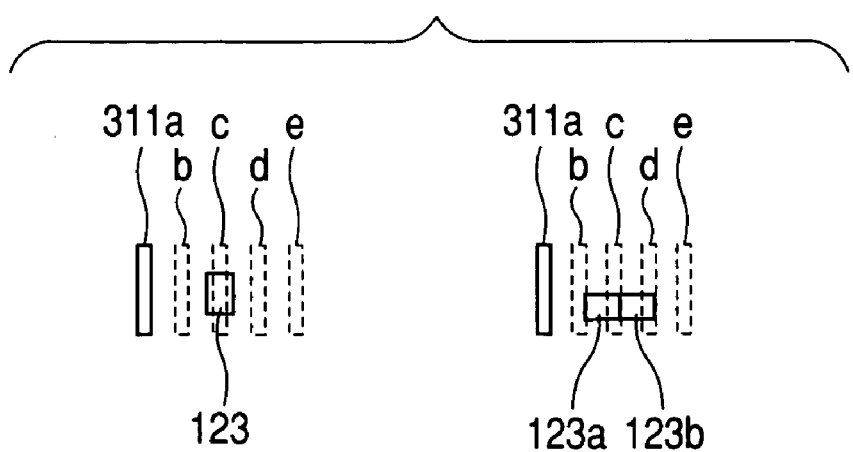

FIG. 4B shows how the light receiving sensor detects this movement. The left-hand view shows the case of using a single-cell photodiode; the light impinges on the light receiving sensor 123 when the reference image 311 reaches a position c in the course of movement in order of a, b, c, d, and e. The right-hand view shows the case of using a two-cell photodiode; the light impinges on the boundary between two sensors 123$a$ and 123$b$ when the reference image 311 reaches the position C in the course of the similar movement. With the two-cell photosensor as shown in right drawing of FIG. 4B, since the matching detection can be made under such a condition that signals detected by both the sensors coincide with each other, so an accuracy of position detection can be improved to some degree compared to the method of simply detecting a peak position as shown in left drawing of FIG. 4B.

Next, referring to flowcharts of FIGS. 7 and 8, a software-based processing procedure according to the embodiment of the present invention will be described.

Figure 7:
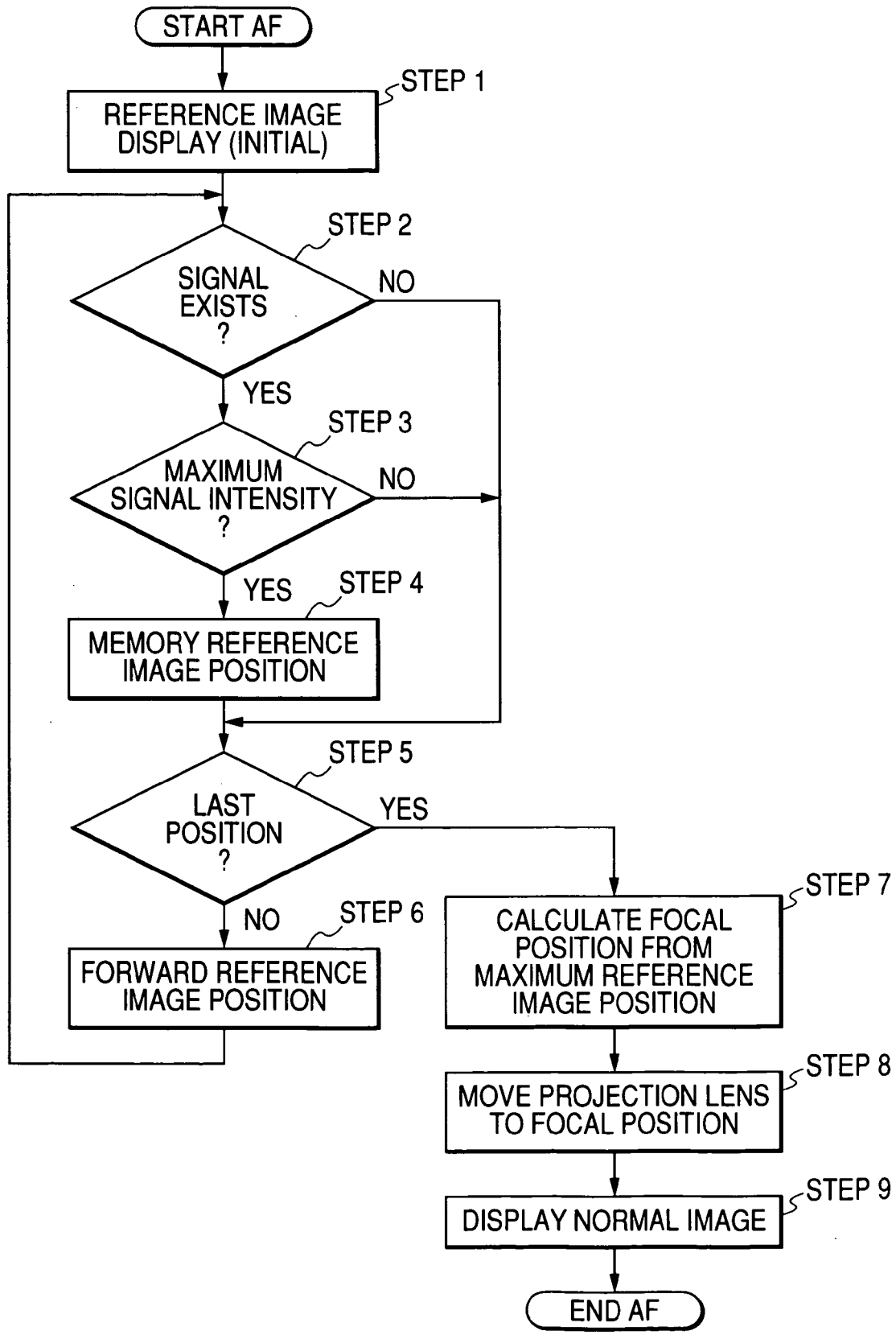
FIG. 7 is a flowchart illustrative of the embodiment of the present invention.

First, an aspect shown in FIG. 7 is described.

(Step 1) Entering an automatic focusing (AF) mode, first an image inputted to the display means is switched from a normal image to a reference image. The reference image is first set to an initial position on the extreme left.

(Step 2) In this step, detection is made of whether or not the signal exists in the light receiving sensor. If the signal does not exist, the process advances to step 5; if the signal exists, the process advances to the next step.

(Step 3) Whether or not the signal has the maximum intensity is checked, and if the maximum intensity is confirmed, the reference image position (pixel coordinates) at this point is updated and memorized in the next step, i.e., step 4.

(Step 5) It is checked whether or not the reference image arrived at the last position, and if arrived, the process advances to step 7; if not arrived, the process moves to step 6, and the reference image position is forwarded to the next position to return to step 2.

(Step 7) Based on the reference image position where the maximum signal intensity is obtained, the number of pixels counted from the screen center is calculated, and the distance to the screen is calculated from the above-mentioned equation.

(Step 8) The projection lens is moved in accordance with information about the calculated distance and focused.

(Step 9) Finally, the image switched in step 1 is restored to the original, normal image to complete a series of processing's.

The aforementioned processing method is advantageous in terms of a simple program, but has a possibility that when the initial condition is far from being focused so much, accurate detection of a peak position is impossible.

Figure 8:
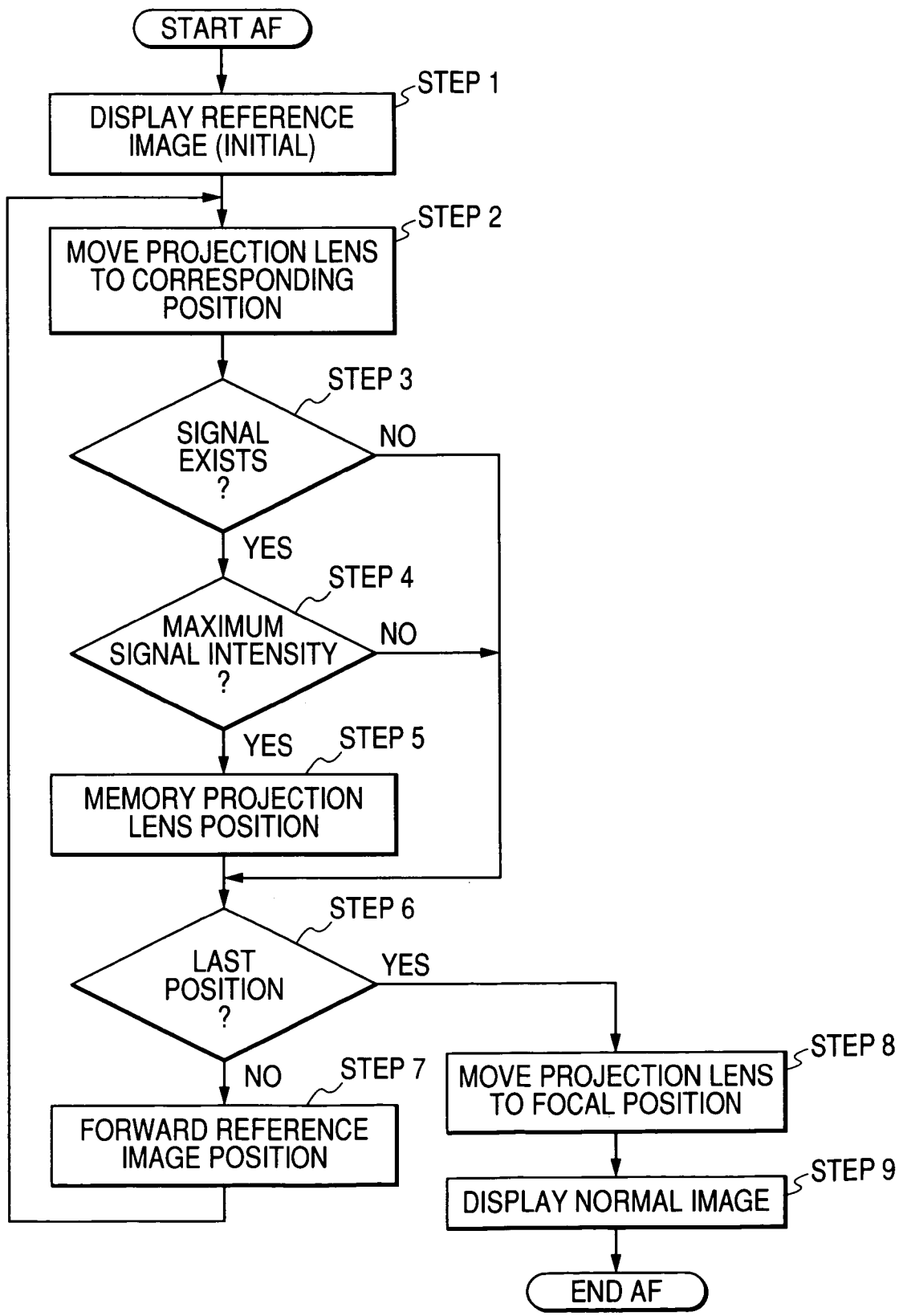
FIG. 8 is a flowchart illustrative of another embodiment of the present invention different from the embodiment shown in FIG. 7.

Next, a structural example of FIG. 8 as a result of making improvements in those respects is described.

(step 1) Entering an automatic focusing (AF) mode, first an image inputted to the display means is switched from a normal image to a reference image. The reference image is first set to an initial position on the extreme left.

(step 2) The projection lens position corresponding to the reference image position is calculated and the lens is moved to the calculated position.

(step 3) It is detected whether or not the signal exists in the light receiving sensor. If the signal does not exist, the process advances to step 6; if the signal exists, the process advances to the next step.

(Step 4) It is checked whether or not the signal has the maximum intensity, and if the maximum intensity is confirmed, the reference image position at this point is updated and memorized in the next step, i.e., step 5.

(Step 6) It is checked whether or not the reference image arrived at the last position, and if arrived, the process advances to step 8; if not arrived, the process moves to step 7, and the reference image position is forwarded to the next position to return to step 2.

(Step 8) The projection lens is moved to a focal position in accordance with information about the projection lens position memorized in step 5.

(Step 9) Finally, the image switched in step 1 is restored to the original, normal image to complete a series of processing's.

With this processing method, the reference image is moved and in addition, the focal position of the projection lens is moved to a corresponding position, so focusing is attained without fail at a position where the peak position is detected, making it possible to detect the peak position with the highest accuracy all the time.

As mentioned above, according to this embodiment, it is possible to provide a high-performance automatic focusing device by making full use of functional characteristics of the projector. To be specific, the high focusing accuracy can be ensured by taking advantage of the "flat shape", which is a shape characteristics of projector used as a desktop devices, and by ensuring sufficient base line length in the triangulation process.

Also, in this embodiment, the image projection means inherent in the projector as a basic function is utilized as the reference image scanning means in the triangulation process, whereby dispensing with the complicated, mechanical scanning means. For example, the projection means in the projection type display means is made to double as the reference image scanning means, whereby the automatic focusing system can be configured without adding any new hardware component as the light projecting means.

Also, the projection optical system in the projection means of the projection type display means is made to double as the projection optical system in the light projecting means, whereby it is unnecessary to separately provide with an optical system for projecting light, leading to further reduction in cost.

In addition, the light receiving means is constituted by the single-cell photosensor, and the position at which the maximum output level of the photosensor is obtained is set as the detecting position. Further, the light receiving means is constituted by a two-cell photosensor, and the position at which the output levels of each sensor of the two-cell photosensor are almost equal to each other is set as the detecting position. Thus, an inexpensive light receiving sensor such as the photodiode can be used as the light receiving sensor, resulting in the minimum cost.

According to the present invention, it is possible to realize the projection type display apparatus capable of cost reduction, where the system can be configured by the simple processing circuit.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-057109 filed Mar. 2, 2004, which is hereby incorporated by reference herein.

What is claimed is:

1. A projection type display apparatus, comprising:

a projection portion for projecting a reference image formed on an image forming element onto a surface to be projected;

a light receiving portion placed apart from the projection portion by a base line length and used for detecting the reference image projected onto the surface to be projected; and a transmitting portion for transmitting an image signal to the image forming element of said projection portion in such a way that the reference image is electronically scanned by said projection portion without using mechanical scanning means on the surface to be projected in a direction of the base line length, wherein focusing in the projection portion is performed based on information about a scanning position of the reference image upon predetermined detection with the light receiving portion.

2. A projection type display apparatus according to claim 1, wherein the light receiving portion includes a single-cell photosensor; and wherein focusing in the projection portion is performed based on information about a scanning position of the reference image for the situations where a signal detected by the light receiving portion has the maximum intensity.

3. A projection type display apparatus according to claim 1, wherein the light receiving portion includes a two-cell photosensor; and wherein focusing in the projection portion is performed based on information about a scanning position of the reference image for situations where signals detected by each photosensor in the light receiving portion have substantially the same intensity.

4. A projection type display apparatus according to claim 1, wherein each time the reference image is scanned by a predetermined amount, the projection portion is driven for focusing and the light receiving portion performs detection.

5. A projection type display apparatus according to claim 1, wherein the information about the scanning position of the reference image includes a distance between the reference image on the surface to be projected and an optical axis of the projection portion.

6. A projection type display apparatus according to claim 1, further comprising an amplifying portion for amplifying a signal detected by the light receiving portion.

* * * * *